S. K. THOMPSON.
CONTROLLING SYSTEM FOR ELECTRICAL APPARATUS.
APPLICATION FILED JAN. 26, 1911.

1,144,264.

Patented June 22, 1915.

Witnesses:
Walter Chism
Willa H. Burrows

Inventor:
Samuel K. Thompson
by his Attorneys:
Howson + Howson

UNITED STATES PATENT OFFICE.

SAMUEL K. THOMPSON, OF JENKINTOWN, PENNSYLVANIA.

CONTROLLING SYSTEM FOR ELECTRICAL APPARATUS.

1,144,364.

Specification of Letters Patent.

Patented June 22, 1915.

Application filed January 26, 1911. Serial No. 604,768.

*To all whom it may concern:*

Be it known that I, SAMUEL K. THOMPSON, a citizen of the United States, and a resident of Jenkintown, Montgomery county, Pennsylvania, have invented certain Improvements in Controlling Systems for Electrical Apparatus, of which the following is a specification.

My invention relates to improvements in electric current generating systems which include a prime mover such as an internal combustion engine, a dynamo electric machine capable of use either as a motor or as a generator, and a storage battery; one object of the invention being to provide what may be described as semi-automatic means for controlling the operation of such a system.

I further desire to provide a system of apparatus such as that above indicated with controlling means which shall include apparatus for giving an alarm when the storage battery is charged or discharged to any predetermined points, and which shall require merely the closing of a switch to cause the starting of the engine and the subsequent operation of the dynamo electric machine as a generator for the purpose of charging the storage battery.

Another object of my invention is to provide a system of the class above noted with controlling apparatus so designed and connected that the manual closure of a switch near to or remote from the remainder of the apparatus, shall be necessary to cause the storage battery to be charged and thereafter when the charging has continued to a predetermined extent an alarm shall be given after which the apparatus may be set in operation to put the generator and engine out of service.

These objects and other advantageous ends I secure as hereinafter set forth, reference being had to the accompanying drawings, in which:—

Figure 2:
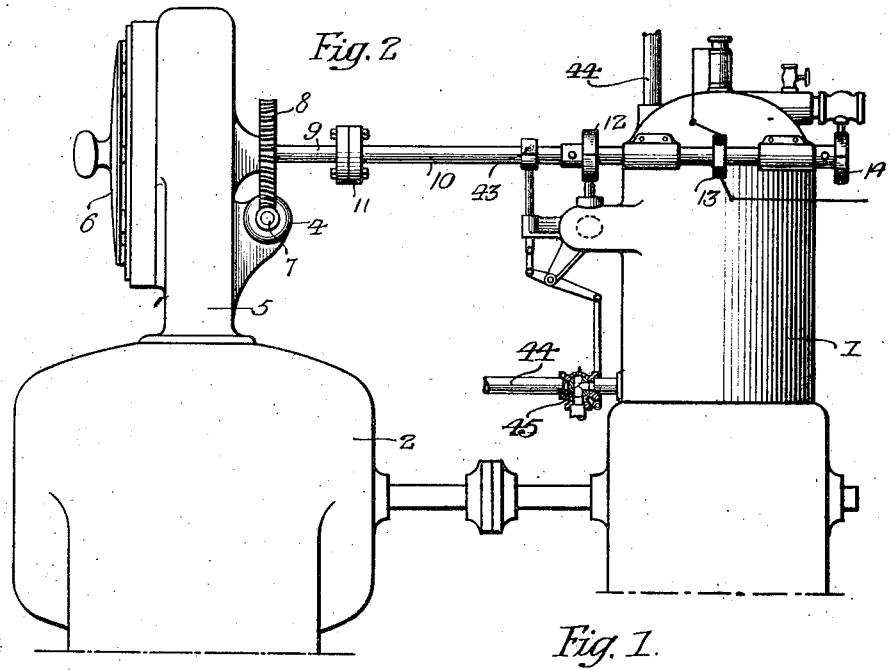
Figure 1:
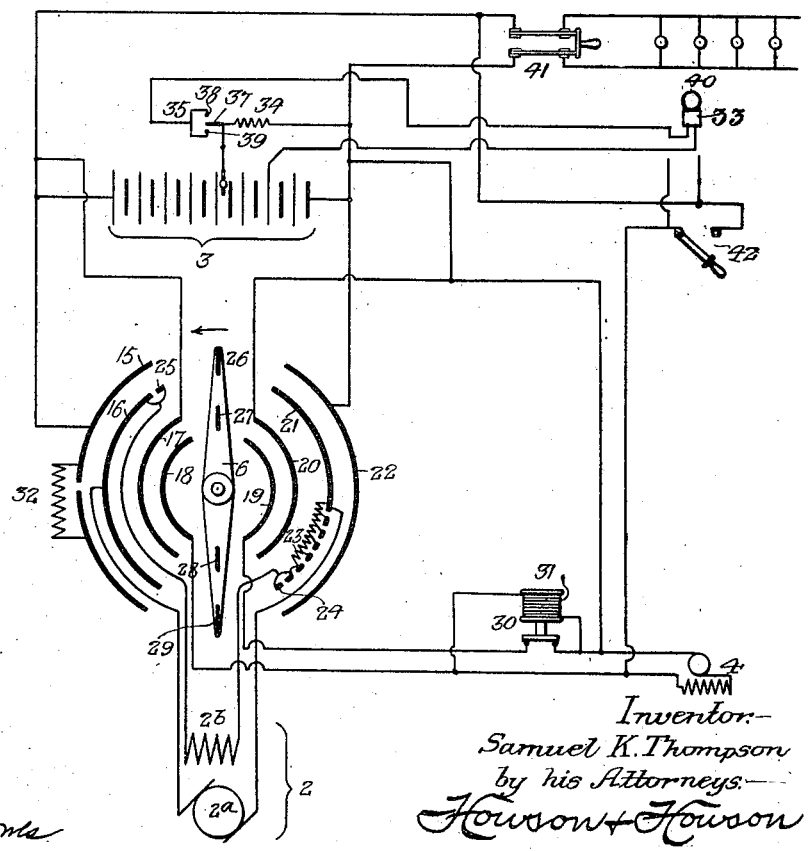

Figure 1 is a diagrammatic view illustrating a system of apparatus arranged according to my invention, and Fig. 2 is a side elevation to some extent diagrammatic illustrating a possible arrangement of certain of the apparatus employed.

In Fig. 2, 1 represents a portion of an internal combustion engine designed to drive a dynamo electric machine 2 for the purpose of generating current to charge a storage battery indicated at 3 in Fig. 1, and which may be cranked in starting by the operation of said machine 2 as a motor under the action of current supplied from the battery.

A pilot motor 4, in the present instance mounted on a frame 5 carried by the dynamo electric machine 2, is provided for the purpose of turning a controller arm 6 and with this idea in view it has attached to its armature shaft a worm 7 meshing with a worm wheel 8 fastened to a shaft 9 to which this controller arm 6 is connected in any suitable manner. A second shaft 10 is so mounted as to form a continuation of the shaft 9 to which it is operatively coupled by means of a clutch 11 of any design which will permit one of said shafts to be axially turned relatively to the other for the purpose of adjusting the position of the cams 12, 13 and 14 carried by it, relatively to the controller arm 6.

The armature of the dynamo electric machine 2 is indicated at $2^a$ and its field winding at $2^b$ and these elements with the terminals of the pilot motor 4 are connected to the various parts of the controller. While this latter may be made in any of a number of forms in the present instance it consists of a number of concentrically curved contact strips numbered from 15 to 22 inclusive, and the armature terminals are connected to the strips 16 and 21, of which the latter strip is sub-divided adjacent one end into a number of contacts respectively connected to various points of a body of armature resistance 23.

The field winding $2^b$ of the dynamo electric machine has its terminals connected to two contacts 24 and 25 in line with the two strips 21 and 16 respectively and is also connected to said strips. The controller handle 6 carries four insulated contacts 26, 27, 28, and 29 of which the first and last are designed to electrically connect the strips 15 and 16, as well as the strips 21 and 22, when said handle is properly turned, while the contacts 27 and 28 are so placed that one of them electrically connects the contact strips 17 and 18 when the other similarly connects the strips 19 and 20.

The two strips 17 and 20 are respectively connected to the terminals of the storage battery, and the strips 18 and 19 are similarly connected to the terminals of the pilot motor 4, although in this connection there is interposed an electro magnetic switch 30 designed to automatically close under the action of gravity. This switch is actuated by a winding 31 connected through the controller to the two terminals of the external circuit supplied from the storage battery, and is of such design that the voltage developed by said battery is normally insufficient to energize it to the extent necessary to cause it to raise or hold up the movable member of the switch 30.

The voltage of the current developed by the generator 2 in charging the storage battery is, however, ordinarily sufficient to retain this switch 30 in its open position, which it does as long as the storage battery is receiving current from said generator. The controller strip 15 is divided into two parts electrically insulated from each other and having respectively connected to them the ends of a bank of resistance 32 which, under certain conditions, may be placed in circuit with the storage battery.

An indicator or alarm device, in the present instance a bell 33, is connected to be supplied with current from the storage battery and thereby operated under certain conditions; one of its terminals being permanently connected to the terminal of one of the battery cells and the other through a body of resistance 34 and a switch 35 to one of the other cells so that the maximum voltage of the current delivered to the bell cannot exceed the proper voltage for operating the same.

The switch 35 includes an instrument such as a hydrometer 36 floating in the liquid of one of the battery cells and carrying a contact member 37 capable of engaging either of two fixed contacts 38 or 39. The first of these contacts is so placed that it is engaged by the movable contact 37 when the instrument 36 to which it is attached is buoyed up to the maximum extent, as when the storage battery is fully charged or is charged to a predetermined extent, while the other contact is similarly engaged by the movable contact 37 when the specific gravity of the liquid in the storage battery has fallen to the predetermined low point existing when the battery has been discharged to the desired or permissible extent.

While any electro receptive devices may be connected to receive current from the storage battery, I have shown an external circuit provided with a series of lamps 40 connected to be supplied through a controlling switch 41. The pilot motor is permanently connected across the terminals of the external circuit through a hand operated switch 42 preferably located near the bell 33.

With the above described arrangement of apparatus, the storage battery 3 will discharge until its specific gravity has so far fallen that the movable contact 37 comes in engagement with the contact 39, whereupon the circuit of the bell 33 is completed and it is set in operation, thereby giving notice that the battery requires charging. The switch 42, which with the bell may be mounted at any desired point remote from the battery, engine, and dynamo electric machine, is then closed, thus completing the circuit of the pilot motor 4 which is thereby put into operation. As a result the shafts 9 and 10 are turned through the worm 7 and worm wheel 8, thereby so turning the controller handle 6 that it first connects the field winding $2^b$ of the dynamo electric machine with the storage battery and thereafter supplies current from said battery to the armature $2^a$ through the resistance 23, the movement of said handle occurring in the direction of the arrow. As a result the dynamo electric machine starts and operates as a motor, cranking the engine 1 at a speed which increases as the controller arm is so moved as to cut out resistance 23. This revolution of the shafts 9 and 10 so turns the cams 12, 13 and 14 that fuel is admitted to the engine, and the sparking circuit is closed, as is also the compression valve; it being understood that the said shaft 10 with its cams has been previously adjusted relatively to the shaft 9 so that the above described operations take place at the proper times.

The engine 1 being thus cranked and supplied with fuel as well as having the circuit of its igniting means closed, starts to operate, thereby driving the armature of the dynamo electric machine and causing it to generate current. The movement of the controller handle 6 which causes the above described operations also causes the contact 27 to electrically connect the contacts 17 and 18 and the contact 28 to connect the contacts 19 and 20, so that the pilot motor 4 is supplied with current from the storage battery independently of the switch 42, which, after being held closed for a sufficient time to insure the completion of this circuit, is opened by the operator. As soon as the engine comes up to speed and thereby causes the dynamo electric machine 2 to generate current at the charging voltage, the winding 31 is energized sufficiently to draw up the movable member of the switch 30 and cut the pilot motor 4 out of circuit, thus leaving the controller handle 6 in a position in which the charging current flows through the resistance 32.

With the arrangement described, the operation of the engine will continue until the storage battery is so far charged that the contact 37 comes into engagement with the contact 38, thus again completing the circuit of the bell 33 and thereby giving indication of the charged condition of the battery. The closing of the switch 42 by the operator will then again supply current to the pilot motor 4 which causes such a revolution of the shafts 9 and 10 that the controller handle 6 is moved to the position shown in Fig. 1, out of engagement with the various segmental contacts, and the cams 12, 13 and 14 are so operated that the sparking circuit of the engine is opened, the supply of fuel is cut off and the compression valve is likewise opened. The winding 31 is also sufficiently deënergized, by the stoppage of the engine or by a drop in the battery voltage to cause the movable member of the switch 30 to fall to its closed position. The battery may now be used to provide current in the well known manner and when discharged may again be supplied with a charging current as above described, by the closure of the switch 42 for a time long enough to permit the controller arm 6 to engage its various contacts.

It will be noted that with my system, any failure of the engine or dynamo electric machine during charging, automatically causes said machine to be cut out of circuit, since immediately upon the cessation of the charging current, the switch 30 would close, owing to the inability of the coil 31 to hold the movable switch member in its open position. The pilot motor 4 would therefore at once start and therefore operate the controller handle 6 until this opened the pilot motor circuit as well as the circuit of the dynamo electric machine, whereupon the various parts would necessarily come to rest in the positions illustrated;—the shaft 10 with its cams being also turned into position to cause stoppage of the engine in case this still continued to operate.

If the internal combustion engine 1 be cooled by a flow of water which circulates constantly during its operation from some source of supply independent of the engine, I may provide on the shaft 10 a fourth cam 43 of such design as to cut off the supply of cooling liquid in the circulating pipe 44 whenever the cams 12, 13 and 14 have been moved to such positions as to cause the engine to come to rest; any desired form of valve 45 being provided in proper position to coöperate with this cam. This valve may be placed in such a position that it will drain the water jacket when closed, thus preventing injury to the engine from freezing when it is in an exposed position.

I claim:—

1. A system including an engine; a dynamo electric machine operatively connected to said engine; a storage battery; and controlling apparatus including means for supplying current from the battery at will to start the engine and thereby causing the dynamo electric machine to charge the battery, with automatic means including an electromagnetic switch, a motor and a switch controlled by said motor for causing stopping of the engine upon the cessation of the charging current.

2. A system including an engine; a dynamo-electric machine operatively connected thereto; a storage battery; a controlling switch for said battery and electric machine; a pilot motor for actuating said switch; a manually controlled switch independently connected to the storage battery and to the pilot motor for starting the latter at will; and means independent of said switch for automatically stopping said pilot motor.

3. A system including an engine; a dynamo electric machine operatively connected thereto; a storage battery; a controller for said electric machine and battery; a pilot motor for actuating said controller; and a switch for starting said pilot motor at will; said controller including means for automatically stopping the pilot motor.

4. A system including an engine; a dynamo electric machine; a storage battery; a controller for the battery and electric machine; a pilot motor for actuating the movable member of said controller; a hand-operated switch for starting said pilot motor at will; and an automatic switch in circuit with the motor including means whereby the circuit of said motor is maintained open as long as the storage battery is being charged.

5. A system including an engine; a dynamo electric machine; a storage battery; a controller for the battery and electric machine; a pilot motor for actuating the movable member of said controller; two switches in circuit with the pilot motor; with means for maintaining one of said switches open when the dynamo electric machine is charging the battery.

6. A system including a dynamo electric machine; an engine for actuating the same; a storage battery; a controller for governing the flow of current between the battery and the electric machine; a pilot motor for operating said controller; a switch for the pilot motor; with an electromagnet connected to the storage battery for actuating said switch; said magnet being wound to operate the switch only when the generator is charging the battery.

7. A system including an engine; a dynamo electric machine actuated thereby; a storage battery; a controller for said battery and electric machine; a pilot motor for actuating the controller; and a switch in circuit with the pilot motor for starting the same at will; said controller including connections for completing the circuit of the pilot motor independently of said switch.

8. A system including an engine; a dynamo electric machine actuated thereby; a storage battery; a controller for said battery and electric machine; a pilot motor for actuating the controller; and a switch in circuit with the pilot motor for starting the same at will; said controller including a switch for completing the circuit of the pilot motor independently of said first switch; with a third switch connected between the motor and the controller for preventing operation of said motor by current from the controller when the dynamo electric machine is charging the battery.

9. A system including an engine; a dynamo electric machine; a storage battery; a controller for said battery and machine; a device for controlling the admission of fuel to the engine; and a pilot motor for actuating said device and the controller.

10. A system including an engine; means for controlling the ignition of said engine; a dynamo electric machine; a storage battery; a controller for said battery and electric machine; and a motor governed in part by the controller for operating said ignition controlling means and also the controller.

11. A system including an engine having a releasable compression valve; means for actuating said valve; a dynamo electric machine driven by the engine; a storage battery; a controller for said battery and electric machine; and a motor governed in part by the controller for operating said valve actuating means and the controller.

12. A system including an engine having an ignition controlling device; a dynamo electric machine connected to the engine; a storage battery; a controller for governing the flow of current between said machine and the battery; a pilot motor for actuating said controller; means for actuating the ignition controlling device from said pilot motor; a switch for starting the pilot motor at will; and another switch for automatically stopping said pilot motor under predetermined conditions.

13. A system including an engine; a dynamo electric machine operatively connected thereto; a storage battery; a controller for governing the flow of current between the battery and the electric machine; a pilot motor for actuating said controller; means for automatically stopping the pilot motor while the storage battery is being charged; and a switch for causing starting of the pilot motor at will.

14. A system including an engine; a dynamo electric machine operatively connected thereto; a storage battery; a controller between the electric machine and said battery including fixed contacts and an arm carrying a movable contact; a motor for moving said arm; said controller including a switch for automatically breaking the connection between the battery and the dynamo electric machine when the voltage of said machine falls below a predetermined point.

15. A system including an engine; a dynamo electric machine connected thereto; a storage battery; a controller having fixed and movable contacts for governing the flow of current between said battery and said electric machine; said controller including an arm carrying the movable contacts; a pilot motor arranged to turn said arm in a fixed direction; manually controlled means for starting said pilot motor at will; and automatically acting means for stopping said motor under predetermined conditions.

16. A system including an engine; a dynamo electric machine connected thereto; a storage battery; a controller having a rotatable member; a pilot motor connected to always turn said member in the same direction; and means for governing the operation of said motor.

17. A system including an internal combustion engine; a dynamo electric machine operatively connected thereto; a controller for said electric machine; igniting and fuel controlling devices for the engine; a rotatable shaft connected to both of said devices and to the controller; with a motor for rotating said shaft.

18. A system including an internal combustion engine; a dynamo electric machine operatively connected thereto; a controller for said machine; a valve for controlling the admission of fuel to the engine; a rotatable member connected to the valve and to the controller for actuating both of the same; and a motor for rotating said member.

19. A system including an internal combustion engine; a dynamo electric machine operatively connected thereto; a controller for said machine; a relief valve for the engine; means for operating said valve; and a motor connected to said valve operating means and to the controller for actuating both of the same.

In testimony whereof, I have signed my name to this specification, in the presence of two subscribing witnesses.

SAMUEL K. THOMPSON.

Witnesses:
 WILLIAM E. BRADLEY,
 WM. A. BARR.

Copies of this patent may be obtained for five cents each, by addressing the "Commissioner of Patents, Washington, D. C."